(12) United States Patent
Hammoud (10) Patent No.: US 9,449,059 B2
(45) Date of Patent: *Sep. 20, 2016

(54) REPORT DATA JUSTIFIERS

(75) Inventor: Amer Hammoud, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 605 days.

This patent is subject to a terminal disclaimer.

(21) Appl. No.: 13/291,937

(22) Filed: Nov. 8, 2011

(65) Prior Publication Data

US 2013/0117320 A1 May 9, 2013

(51) Int. Cl.
*G06F 17/30* (2006.01)

(52) U.S. Cl.
CPC ... *G06F 17/30554* (2013.01); *G06F 17/30395* (2013.01); *G06F 17/30398* (2013.01)

(58) Field of Classification Search
CPC .................. G06F 17/30554; G06F 17/30398
USPC ................................................. 707/796, 792
See application file for complete search history.

(56) References Cited

U.S. PATENT DOCUMENTS

| | | | |
|---|---|---|---|
| 6,301,579 B1 * | 10/2001 | Becker | |
| 6,801,910 B1 | 10/2004 | Bedell et al. | |
| 7,584,425 B2 | 9/2009 | Nader et al. | |
| 7,756,822 B2 | 7/2010 | Danner et al. | |
| 7,788,146 B2 | 8/2010 | McCarthy, Jr. | |
| 7,822,654 B2 | 10/2010 | Block et al. | |
| 7,870,480 B1 | 1/2011 | Oswald et al. | |
| 7,945,850 B2 | 5/2011 | Machalek | |
| 7,949,937 B2 | 5/2011 | Wu | |
| 2003/0233257 A1 | 12/2003 | Matian et al. | |
| 2004/0034615 A1 * | 2/2004 | Thomson et al. | 707/1 |
| 2004/0215626 A1 * | 10/2004 | Colossi et al. | 707/100 |
| 2005/0192963 A1 | 9/2005 | Tschiegg et al. | |
| 2007/0055782 A1 * | 3/2007 | Wright et al. | 709/227 |
| 2007/0124361 A1 * | 5/2007 | Lowry | G06Q 10/06 709/201 |
| 2007/0233651 A1 * | 10/2007 | Deshpande et al. | 707/3 |
| 2011/0137917 A1 | 6/2011 | Boland et al. | |

OTHER PUBLICATIONS

Office Action from U.S. Appl. No. 13/610,437, dated Mar. 26, 2014, 11 pp.
Response to Office Action mailed Mar. 26, 2014, from U.S. Appl. No. 13/610,437, filed Jun. 26, 2014, 8 pp.

(Continued)

*Primary Examiner* — Mahesh Dwivedi
*Assistant Examiner* — Johnese Johnson
(74) *Attorney, Agent, or Firm* — Shumaker & Sieffert, P.A.

(57) ABSTRACT

A method includes providing a source report for display that includes a first plurality of data values each associated with a first context, the first context comprising an intersection of dimensions of a multidimensional database. The method includes receiving a selection of a first data value of the first plurality, and providing a drill-through report for display generated based at least in part on the selected data value. The drill-through report includes a second plurality of data values each associated with a second context comprising an intersection of at least one dimension of the first context and at least one other dimension not in the first context. The method includes receiving an indication of a relationship between the selected data value and the drill-through report, updating the source report to include a graphical representation of the relationship, and providing the updated source report having the graphical representation for display.

11 Claims, 5 Drawing Sheets

(56) References Cited

OTHER PUBLICATIONS

Final Office Action from U.S. Appl. No. 13/610,437, dated Oct. 24, 2014, 12 pp.
Amendment in Response to Final Office Action mailed Oct. 24, 2014, from U.S. Appl. No. 13/610,437, filed Dec. 22, 2014, 7 pp.
Advisory Action from U.S. Appl. No. 13/610,437, dated Jan. 8, 2015, 3 pp.
Response to Office Action dated Apr. 24, 2015, from U.S. Appl. No. 13/610,437, filed Jul. 24, 2015, 8 pp.
Office Action form U.S. Appl. No. 13/610,437, dated Apr. 24, 2015, 11 pp.
Michael Gertz et al., "A Model and Architecture for Conceptualized Data Annotations," Technical Report CSE-2001-11, Department of Computer Science, University of California, Davis (27 pages) (Nov. 2001).
"Data Integration", retrieved from "http://en.wikipedia.org/wiki/Data_integration" last modified Jul. 14, 2011 (6 pages).
Torsten Priebe, "INWISS—Integrative Enterprise Knowledge Portal," The 3rd International Semantic Web Conference (ISWC 2004) 4 pages.
Yingwei Cui, "Lineage Tracing in Data Warehouses," A dissertation submitted to the Department of Computer Science and the Committee on Graduate Studies of Stanford University, Dec. 2001 (208 pages).
Haralampos Karanikas et al., "Multimedia Annotation System for Intelligent Search," Proc. International Conference on Telecommunications & Multimedia (TEMU 06), ISBN 960-88785-2-7, Heraklion-Crete, Greece, Jul. 2006 (9 pages).
Atanas Kiryakov et al., "Semantic Annotation, Indexing, and Retrieval," Journal of Web Semantics, vol. 2, No. 1, http://www.websemanticsjournal.org/ps/pub/2005-10, 2005 (39 pages).
Jan Nemrava et al., "Semantic Annotation and Linking of Competitive Intelligence Reports for Business Clusters," OBI '08 Proceedings of the first international workshop on Ontology-supported business intelligence, 2008 (5 pages).
Torsten Priebe, "Towards Integrative Enterprise Knowledge Portals," Proceedings of the Twelfth International Conference on Information and Knowledge Management, 2003 (pp. 216-223).
Daniel Demer et al., "IBM Total Storage Expert Reporting How to Produce Built-In and Customized Reports," ibm.com/redbooks, Oct. 2003 (378 pages).
Final Office Action from U.S. Appl. No. 13/610,437, dated Jan. 5, 2016, 11 pp.
Amendment in Response to Office Action mailed Jan. 5, 2016, from U.S. Appl. No. 13/610,437, filed Mar. 4, 2016, 8 pp.
Notice of Allowance from U.S. Appl. No. 13/610,437, mailed Apr. 11, 2016 9 pgs.

* cited by examiner

|  |  | 2009 | 2010 | 2011 |
|---|---|---|---|---|
| North Farms | Apple | 200,000 | 300,000 | 250,000 |
|  | Orange | 100,000 | 120,000 | 117,000 |
|  | Banana | 40,000 | 35,000 | 76,000 |
| South Farms | Apple | 72,000 | 75,000 | 74,000 |
|  | Orange | 99,000 | 55,000 | 87,000 |
|  | Banana | 15,000 | 12,000 | 22,000 |
| East Farms | Apple | 37,000 | 39,000 | 36,000 |
|  | Orange | 18,000 | 15,000 | 16,000 |
|  | Banana | 7,000 | 50,000 | 47,000 |

| Drill-Throughs |
|---|
| year-location-average temperature |
| year-location-total rainfall |
| year-location-irrigation utilized ☆ |
| year-location-loss due to pests |
| year-location-crop-revenue |
| year-location-labor cost ✗ |
| year-fertilizer cost |
| year-location-packaging cost |

REPORT DATA JUSTIFIERS

BACKGROUND

The present disclosure relates to software systems and, in particular, to software systems for enterprise business planning.

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

In many situations, several users may wish to view and analyze data retrieved from an enterprise software system. The data may be stored in the enterprise software system in multidimensional cubes. For example, multidimensional data cubes include multiple dimensions and measures. In general, a dimension is a structural attribute of a data cube that is an organized hierarchy of categories. For example, a geography dimension might include levels for country, region, state or province, and city. Measures represent the data values along the cells of the dimension.

The data presented to the user may be generated based on an intersection of two or more dimensions of a multidimensional data cube. When analyzing the data, a user may select additional dimensions not included in the initial report to analyze certain portions of the data in view of the additional dimensions selected by the user.

BRIEF SUMMARY

In one embodiment, a method includes providing a source report for display by a computing device, wherein the source report includes a first plurality of data values each associated with a first context, and wherein the first context comprises an intersection of two or more dimensions of a multidimensional database. The method further includes receiving a selection of a first data value of the first plurality of values, providing a drill-through report for display by the computing device, wherein the drill-through report is generated based at least in part on the selected first data value, wherein the drill-through report includes a second plurality of data values each associated with a second context, and wherein the second context comprises an intersection of at least one of the two or more dimensions of the first context and at least one other dimension of the multidimensional database that is not included in the first context. The method further includes receiving an indication of a relationship between the selected first data value and the drill-through report, and providing the updated source report having the graphical representation of the indicated relationship for display by the computing device.

In another embodiment, a computer program product to operate a multidimensional database comprises a computer-readable medium having computer-readable program code embodied therewith. The computer-readable program code includes computer-readable program code to provide a source report for display, wherein the source report includes a first plurality of data values each associated with a first context, and wherein the first context comprises an intersection of two or more dimensions of a multidimensional database. The computer-readable program code further includes computer-readable program code to receive a selection of a first data value of the first plurality of data values, and provide a drill-through report for display, wherein the drill-through report is generated based at least in part on the selected first data value, wherein the drill-through report includes a second plurality of data values each associated with a second context, and wherein the second context comprises an intersection of at least one of the two or more dimensions of the first context and at least one other dimension of the multidimensional database that is not included in the first context. The computer-readable program code further includes computer-readable program code to receive an indication of a relationship between the selected first data value and the drill-through report, to update the source report to include a graphical representation of the indicated relationship between the selected first data value and the drill-through report, and to provide the updated source report having the graphical representation of the indicated relationship for display.

In another embodiment, a computing device comprises one or more processors, a source report module, a drill-through module, and a justification module. The source report module is executable by the one or more processors to provide a source report for display by one or more output devices of the computing device, wherein the source report includes a first plurality of data values each associated with a first context, and wherein the first context comprises an intersection of two or more dimensions of a multidimensional database, and to receive a selection of a first data value of the first plurality of data values. The drill-through module is executable by the one or more processors to provide a drill-through report for display by the one or more output devices, wherein the drill-through report is generated based at least in part on the selected first data value, wherein the drill-through report includes second plurality of data values each associated with a second context, and wherein the second context comprises an intersection of at least one of the two or more dimensions of the first context and at least one other dimension of the multidimensional database that is not included in the first context. The justification module is executable by the one or more processors to receive an indication of a relationship between the selected first data value and the drill-through report, and to cause the source report module to update the source report to include a graphical representation of the indicated relationship between the selected first data value and the drill-through report, and provide the updated source report having the graphical representation of the indicated relationship for display by the one or more output devices.

The details of one or more aspects of this disclosure are set forth in the accompanying drawings and the description below. Other features, objects, and advantages of the disclosure will be apparent from the description and drawings, and from the claims.

DETAILED DESCRIPTION

Computing devices may provide a graphical user interface (GUI) that displays information, such as information of a database. The GUI may enable users to manipulate user interface elements to view different members, different dimensions, or different dimensional levels of the database. A user may view data generated based on an intersection of two or more dimensions of a multidimensional database in a source report displayed using the GUI. In some instances, the user may select a particular data value and view the selected data value as part of second report, often known as a "drill-through" report. In general, a drill-through report may enable a user to view the selected data value in the context of other data not displayed in the source report. That is, a drill-through report may provide additional details about the selected data value. For example, a drill-through report may display the selected data value in the context of one or more dimensions not included in the source report. A user may generate a drill-through report by selecting a data value from a source report, and then selecting a dimension group from a resulting menu. This may be referred to as "drilling-down" through the data using the selected data value. The user may draw a conclusion about the relationship between the selected data value and the other dimensions or have various comments about the selected data value in the context of the other dimension. When other users view the selected data value in the context of the other dimensions, the previous user's conclusions may not be viewable by the other users. Instead, each of the other users may view the selected data value in the context of the other dimensions without knowledge that another user previously viewed and analyzed the same data. As a result, subsequent users may potentially duplicate the time and effort spent by a previous user.

Techniques of the present disclosure may enable the conclusions and comments of a previous user to be associated with the selected data value for future retrieval by the previous user or other users. In particular, techniques of this disclosure may, in various instances, store relationship conclusions and/or comments that may be associated with each data value for later retrieval. For example, a user may generate a drill-through report based on a selected data value and one or more other dimensions and enter a conclusion (or "report data justifier") regarding the selected data value and the data of the drill-through report. In some examples, a user may also enter one or more comments about the selected data value in view of the drill-through report. The conclusions and any comments associated with the selected data value are stored such that a subsequent user may view the conclusions or any comments made by previous users.

The source report displayed to the user in the GUI may include a graphical indication of a conclusion and any comments associated with each data value included in the source report. For example, if a user enters a particular conclusion (e.g., "justified") with regards to a data value in view of the drill-through report, a cell of the source report that is associated with the data value may be updated to include a colored background or to include a symbol (e.g., a starburst) to indicate the conclusion. In some examples, the graphical indication corresponds to a particular conclusion a user reached about the data value in the context of the drill-through report (e.g., that the other dimension is "justified" or has a meaningful effect on the value of the particular data value). In these and other examples, the cell associated with the data value may also be updated to indicate that a user has entered a comment regarding the data value (e.g., the cell may include one or more symbols, a colored background, etc.).

Techniques of the present disclosure may provide one or more advantages. For example, after a user views a drill-through report and enters a report data justifier corresponding to a data value in the source report, subsequent users may view the conclusion in the source report (e.g., the report data justifier is graphically indicated in the source report). In this manner, subsequent users may avoid generating and analyzing drill-through reports previously generated and analyzed by other users, thus potentially reducing the amount of overlapping or redundant work performed by the users while still providing sufficient flexibility to enable the users to change previously stored conclusions and comments.

Figure 1:
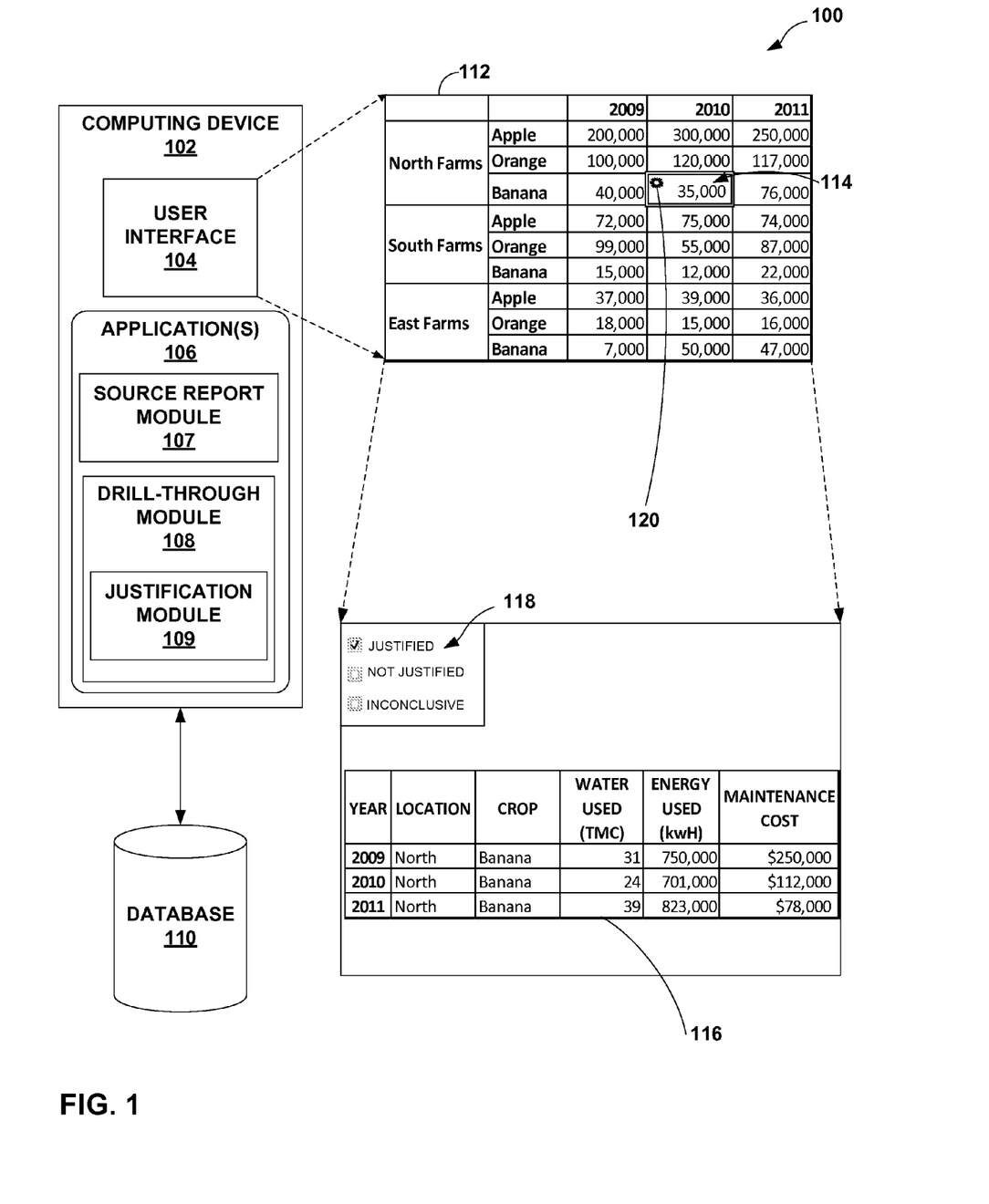
FIG. 1 is a conceptual diagram illustrating an example of a system for providing report data justifiers, in accordance with one or more aspects of the present disclosure.

FIG. 1 is a conceptual diagram illustrating an example of a system for providing report data justifiers, in accordance with one or more aspects of the present disclosure. In various instances, system 100 may include computing device 102 and database 110. Computing device 102, in some examples, may include or be a part of a portable computing device (e.g., a mobile phone, netbook, laptop, personal digital assistant (PDA), tablet device, and the like), desktop computer, or server. As shown in FIG. 1, computing device 102 may include user interface 104 and may execute one or more applications 106 including source report module 107 and drill-through module 108. Computing device 102 may access database 110. In some examples, database 110 may be part of computing device 102, such as a database stored in one or more storage devices of computing device 102. In certain examples, database 110 may be part of one or more devices that are separate from computing device 102, such as one or more servers that computing device 102 may access using a wired or wireless network or both. For example, computing device 102 may use a communications unit of computing device 102 to access database 110 using a telephone network such as a cellular telephone network, a wide-area network such as the Internet, a local-area network (LAN), an enterprise network, or one or more other types of networks.

Examples of database 110 may include, but are not limited to, relational databases, multi-dimensional databases, hierarchical databases, object-oriented databases, or one or more other types of databases. As one example, database 110 may be a multi-dimensional database. The multi-dimensional database may include a group of dimensions having one or more dimensional levels. Each dimensional level may include one or more dimensional members. For example, a time dimension may include year and quarter dimensional levels. The year dimensional level may include 2009, 2010, and 2011 dimensional members. The quarter dimensional level may include quarter one (Q1), quarter two (Q2), quarter three (Q3) and quarter four (Q4) dimensional members. Each of the dimensions may also be considered members of the multi-dimensional database.

Information within a multi-dimensional database may be identified using an intersection of the members of the dimensional levels. For example, the intersection of a member of a year dimensional level of a time dimension (e.g., a particular year) with a quarter dimensional level of the time dimension may identify the information associated with the quarters of the particular year. Similarly, the intersection of a member of a sales quantity dimensional level of a measures dimension with a member of a crop dimension of the database (e.g., a particular crop) and a member of the time dimension may identify the quantity of the particular product sold during a particular period of time (e.g., the number of apples sold in 2009).

In the example of FIG. 1, source report module 107 may generate source report 112 based on data included in two or more dimensions of database 110. The data values included in source report 112 may be generated based on an intersection of the dimensional levels included in the source report. Source report 112 also includes drilled cell 114. The term "drilled cell" may be used to describe a cell of a source report (e.g., source report 112) for which a user has generated a drill-through report (e.g., drill-through report 116). In the example of FIG. 1, the data value of drilled cell 114 is generated based on the intersection of north farms of the location dimension, banana of the crop dimension, and 2010 of the time dimension. In some instances, a user may wish to select a single data value of the source report, and view the data value with respect to other dimensions in conjunction with the dimensions included in the source report.

For example, a user may wish to view the data value of drilled cell 114 with respect to one or more dimensions of database 110 not included in source report 112, such as water usage, energy usage, and maintenance cost. To view the data value with respect to one or more of the other dimensions, a user may interact with the source report 112 (e.g., by performing a "mouseover" on a cell and selecting a field of a drill-through menu). As further described with respect to FIG. 3, drill-through module 108 may cause user interface 104 to display a drill-through menu. The drill-through menu may present a user with dimension groups that each include at least one dimension of source report 112 and at least one dimension absent from source report 112. In this example, a user may select a dimension group that includes dimensions such as time, location, crop, water usage, energy usage, and maintenance cost.

Responsive to the user's selection of a dimension group from a drill-through menu, drill-through module 108 may cause user interface 104 to display drill-through report 116 corresponding to the data of drilled cell 114 and the selected dimension group. Drill-through report 116 includes the time, location, and crop dimensions of source report 112. Additionally, drill-through report 116 includes water usage, energy usage, and maintenance cost dimensions not included in source report 112. By viewing drill-through report 116, a user may reach a conclusion as to whether the data value of drilled cell 114 is justified by data included in one or more dimensions not shown in source report 112. For example, the user may reach a conclusion as to whether or not the data of drill-through report 116 provides a basis for the data value of drilled cell 114.

In the example of FIG. 1, drill-through module 108 further includes justification module 109. Justification module 109 may cause user interface 104 to display justifier menu 118 along with drill-through report 116. A justifier menu may enable a user to select a single report data justifier from a set of report data justifiers. In the example of FIG. 1, justifier menu 118 includes a set of three report data justifiers, namely, report data justifiers with values of "justified," "not justified," and "inconclusive." In this example, a user has selected the report data justifier comprising a "justified" value with reference to drill-through report 116, indicated by the presence of a checkmark in the checkbox corresponding to the "justified" value. By selecting the "justified" report data justifier from justifier menu 118, a user may indicate that he/she has reviewed the data included in drill-through report 116, and is satisfied that the data of drill-through report 116 adequately supports the corresponding data value of source report 112. In another example, a user may select the "not justified" report data justifier from justifier menu 118, to indicate that the user has reviewed drill-through report 116, and determines that the data of drill-through report 116 fails to support the corresponding data value of source report 112. In still another example, a user may select "inconclusive" from justifier menu 118 to indicate that the user could not draw a conclusion regarding the data of drilled cell 114 in view of drill-through report 116.

Based on the report data justifier value selected, justification module 109 may cause source report module 107 to alter the appearance of a cell of source report 112 that is associated with drill-through report 116. In the example of FIG. 1, a user reviewed drill-through report 116 and selected the "justified" value from justifier menu 118. Based on the user's selection of the "justified" value, source report module 108 may alter the appearance of drilled cell 114 to include justification marker 120. In another example, source report module 108 may alter the appearance of drilled cell 114 by changing a background color of drilled cell 114 (e.g., green to indicate the "justified" value).

Source report module 107 may enable one or more subsequent users to determine that a previous user has generated a drill-through report associated with drilled cell 114, reached a conclusion regarding the data value of drilled cell 114 in view of the drill-through report, and/or entered one or more comments regarding the data value of drilled cell 114. In one example, source report module 107 may generate source report 112 with a double-lined border around drilled cell 114 to indicate that a previous user has generated a drill-through report (e.g., drill-through report 116) associated with drilled cell 114. In another example, source repot module 107 may generate source report 112 with a starburst symbol or other justification marker within drill cell 114 to indicate that a previous user concluded that the data value of drilled cell 114 is justified in view of drill-through report 116. In another example, source report module 107 may generate source report 112 with a star or other comment marker within drilled cell 114 to indicate that a previous user entered a comment about drilled cell 114.

In some examples, subsequent users may analyze or review each cell after a previous users has analyzed or commented on the cell. For example, a subsequent user may review the conclusion entered by a previous user, review the drill-through report on which the conclusion is based, and accept or modify the previous user's conclusion. The subsequent user may also review the comments associated with a cell of the source report entered by a previous user and may enter additional comments. In this manner, subsequent users may quickly determine whether each cell of source report 112 has been comment on or analyzed, review the previous conclusions and comments, modify previously entered conclusions, and add additional comments.

Figure 2:
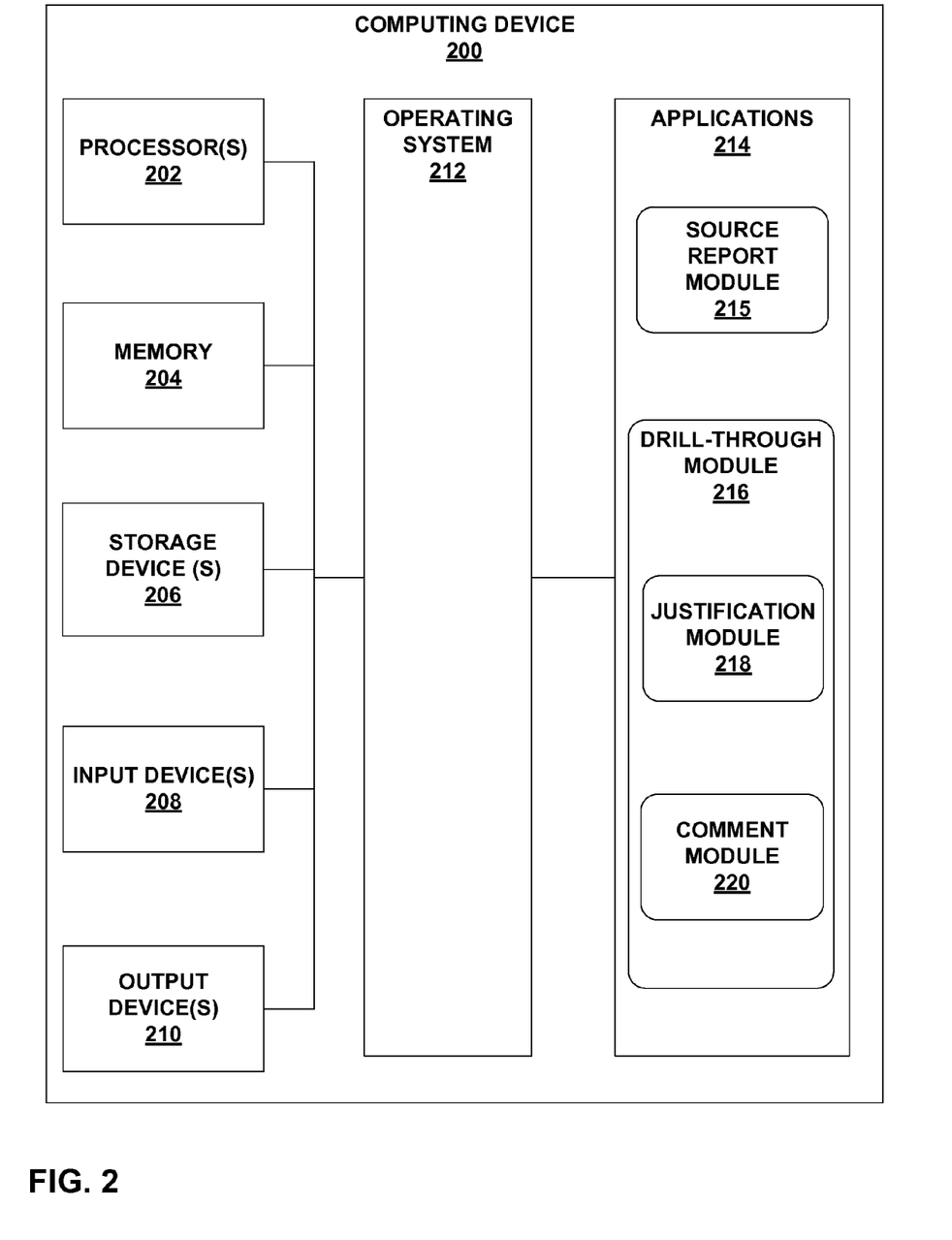
FIG. 2 is a block diagram illustrating an example of a computing device for providing report data justifiers, in accordance with one or more aspects of the present disclosure.

FIG. 2 is a block diagram illustrating an example of a computing device for providing report data justifiers, in accordance with one or more aspects of the present disclosure. As illustrated in FIG. 2, computing device 200 includes processor unit 202, memory 204, persistent storage 206, input devices 208, and output devices 210, operating system 212, and applications 214. Source report module 215 and drill-through module 216 may be included in applications 214.

Computing device 200 may include additional components not shown in FIG. 2 for clarity. For example, if computing device 200 comprises a mobile computing device, computing device 200 may include a battery to provide power to the components of computing device 200. Similarly, the components of computing device 200 shown in FIG. 2 may not be necessary in every example of computing device 200.

One or more processors 202 may include, in some examples, any one or more of a microprocessor, a controller, a digital signal processor (DSP), and application specific integrated circuit (ASIC), a field-programmable gate array (FPGA), or equivalent discrete or integrated logic circuitry. In some examples, one or more storage devices 206 may store one or more instructions that cause one or more processors 202 and one or more of applications 214 to perform various functions ascribed to one or more processors 202 and applications 214.

Memory 204 may be configured to store information within computing device 200 during operation. In some examples, memory 204 is a temporary memory, meaning that a primary purpose of memory 204 may not be long-term storage. Memory 204, in some instances, is described as a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used by software or applications running on computing device 200 (e.g., operating system 212 or one or more applications 214) to temporarily store information during program execution.

One or more storage devices 206 may include any form of machine- or computer-readable media. For example, one or more storage devices 206 may include any volatile, non-volatile, magnetic, optical, or electrical media, such as a hard drive, read-only memory (ROM), electrically-erasable programmable ROM (EEPROM), flash memory, or any other digital media.

Computing device 200 may also include one or more input devices 208 and one or more output devices 210. Input devices 208 may include one or more of a keyboard, mouse, stylus, still camera, video camera, microphone, and other devices that are capable of receiving user input. Output devices 210 may include one or more of a monitor, speaker, video graphics adapter card, sound card, and any other device capable of generating output that may be intelligible to a user. Input devices 208 and/or output devices 210 may also include a touchscreen, presence-sensitive display, or any other input/output capable displays known in the art.

In the example shown in FIG. 2, computing device 200 includes operating system 212 and applications 214, which include source report module 215 and drill-through module 216. Source report module 215 may generate one or more source reports for display by output devices 210. In some examples, a source report generated by source report module 215 may include data from a database communicatively coupled to computing device 200, data from a database stored by one or more storage devices 206, or any combination thereof. The data may be displayed in one or more cells of a source report generated by source report 215.

In some examples, a user may select one of the cells for further analysis. For example, a user may select the cell by interacting with a cell of the source report using one or more of input devices 208. Example interactions include performing a "mouseover" (e.g., by hovering over the cell by placing a cursor over a portion of the cell), "right-clicking" by pressing a right button of a mouse, double-clicking using a left button of a mouse, and tapping a stylus or a selecting with the cell. Upon the user selecting the cell, drill-through module 216 may generate a drill-through menu that includes one or more menu items. Each menu item may present a user with a list of "dimension groups." Each dimension group may include two or more dimensions and/or dimension levels, such that at least one dimension included in the dimension group is also included in the source report, and at least one dimension or dimensional level included in the dimension group is not included in the source report. A user may select a dimension group by interacting with the corresponding menu item associated (e.g., by clicking on the menu item using a mouse of input devices 208).

Responsive to receiving the user selection of the dimension group, drill-through module 216 may generate a drill-through report for display by one or more of output devices 210. The drill-through report generated by drill-through module 216 may include data associated with at least one dimension/dimension level included in the source report and at least one dimension/dimension level not included in the source report, as specified in the selected dimension group. By viewing the data of the drill-through report, the user may draw a conclusion regarding the relationship between the data value selected from the source report and the data included in the drill-through report. The user may also enter one or more comments regarding the data value and the relationship between the data value and the drill-through report.

In some examples, drill-through module 216 may generate a drill-through report that includes a justifier menu. The justifier menu may enable a user to select a report data justifier from a list of potential report data justifies. Each report data justifier may include a value reflecting possible conclusions about the relationship between data included in the drill-through report and the selected data value of the source report. For example, if a user concludes that the data of a drill-through report sufficiently supports the related data in the source report, the user may select a report data justifier value, such as "justified," from the justifier menu.

Responsive to receiving a user selection of a report data justifier, justification module 218 may modify the appearance of the drill-through menu to include an indication of the selected report data justifier. For example, justification module 218 may include an asterisk in a menu item associated with a particular dimension group. In this example, justification module 218 may use the asterisk to indicate that a user has reviewed the drill-through report, and selected a "justified" value associated with the related data. In this and other examples, justification module 218 may alter the appearance of the source report to include a graphical representation of the selected report data justifier.

Comment module 220 may enable a user to add a comment to one or more cells of a source report generated by source report module 215. In one example, comment module 220 may receive a user selection that corresponds with a cell of a source report generated by source report module 215, in view of a drill-through report generated by drill-through module 216. Comment module 220 may receive, from the user, a text-based comment associated with a data value included in the selected cell. In some examples, comment module 220 may alter the appearance of the source report to include a graphical representation associated with the comment.

Figure 3:
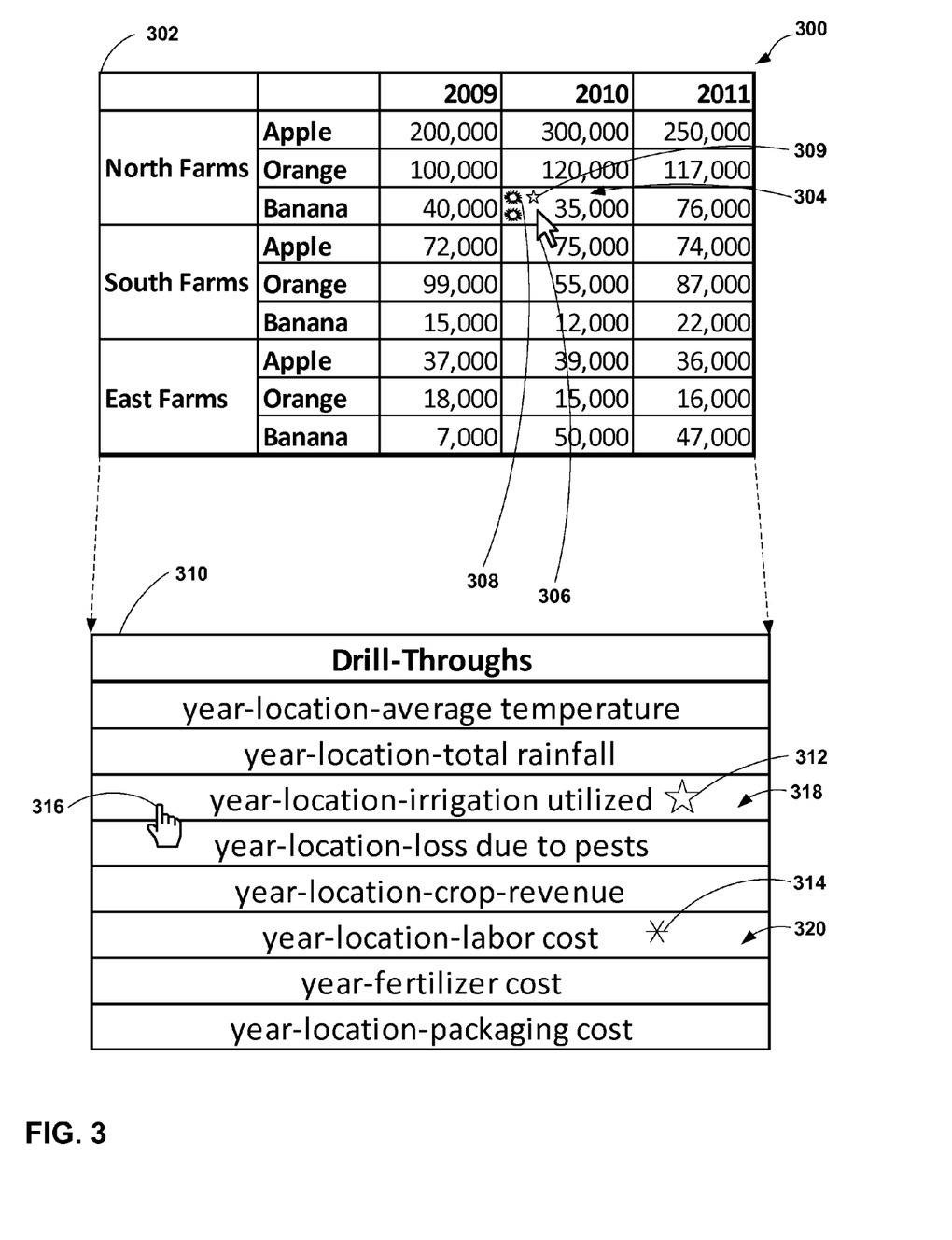
FIG. 3 is a screen illustration of an example of a graphical user interface that includes a source report with a corresponding drill-through menu, in accordance with one or more aspects of the present disclosure.

FIG. 3 is a screen illustration of an example graphical user interface (GUI) 300 that includes source report 302 with corresponding drill-through menu 310, in accordance with one or more aspects of the present disclosure. For purposes of illustration only, the example screen illustration is described below within the context of system 100 of FIG. 1 and computing device 200 of FIG. 2. As shown in FIG. 3, GUI 300 includes source report 302 and drill-through menu 310.

A user may invoke a drill-through menu by performing a "mouseover" on a cell of a source report. To perform a mouseover, a user may use a mouse, stylus, finger, or other input device to place a cursor over at least a portion of a cell (e.g., "hover" over at least a portion of the cell). As shown in FIG. 3, a user performs a mouseover on drilled cell 304 by placing cursor 306 over a portion of drilled cell 304. Drill-through module 108 detects the mouseover and generates drill-through menu 310 associated with drilled cell 304.

Drill-through menu 310 may include a plurality of menu items that each specify one or more groups of dimensions or dimensional levels of the database (e.g., database 110). Each group may include at least one dimension or dimensional level of the database used to generate source report 302, and at least one dimension or dimensional level of the database not used to generate source report 302. For example, each group included in drill-through menu 310 includes the time dimension of source report 302, as shown by the inclusion of the term "year." Each group further includes at least one dimension not included in source report 302 (e.g., the average temperature dimension, total rainfall dimension, etc.) By selecting a particular cell of drill-through menu 310, the user may analyze data associated with drilled cell 304 in the context of the group of dimensions or dimensional levels associated with the selected cell.

In the example of FIG. 3, selection cursor 316 is shown over a portion of menu item 318 to illustrate that a user selected menu item 318. When the user selects menu item 318, drill-through module 108 generates a drill-through report based on data of the dimensions and dimensional levels specified in menu item 318. In this example, the user may view the data value of drilled cell 304 in conjunction with the time, location, and irrigation dimensions. The time dimension is included in source report 302, and the user may analyze the data value in the context of the time dimension, the location dimension, and the irrigation dimension. In this example, the user may view a drill-through report that includes data pertaining to banana production of North Farms and the amount of water used in irrigating the banana crop.

Responsive to a user selecting menu item 318, GUI 300 may display a drill-through report associated with drilled cell 304 and the dimension group of menu item 318. A drill-through report may enable a user to choose a report data justifier associated with data included in the drill-through report. Based on the selection of a particular report data justifier, a drill-through menu may be updated to include a graphical representation associated with the report data justifier (e.g., justification indicator 312). As shown in FIG. 3, justification indicator 312 is a star symbol that, in this example, indicates that a user determined that the drill-through report based on the year, location, and irrigation utilized dimensions justifies (e.g., provides a basis for) the data value included in cell 304. In another example, where the most recent report data justifier chosen by a user is "not justified," item 318 may include a graphical representation such as an "X" character. In an example where the most recent report data justifier chosen by a user is "inconclusive," menu item 318 may include a question mark.

When a user causes a drill-through report to be generated based on a selected value or enters a comment or conclusion about the selected value and drill-through report, drill-through module 216 may update source report 302 to include one or more graphical representations associated with the comment or conclusion. For example, when a user generates a drill-through report based on the value in drilled cell 304, drilled cell 304 may include a bold-lined border to indicate that the user has generated the drill-through report. As another example, when a user enters a comment about the value of drilled cell 304, drilled cell 304 may include comment marker 308. As shown in FIG. 3, comment marker 308 includes two starburst symbols, indicating that one or more users have entered two comments about drilled cell 304. In other examples, the number of starburst symbols is not indicative of the number of comments, such that a single starburst symbol may indicate that one or more users have entered at least one comment.

As another example, when a user enters a conclusion about the value of drilled cell 304 and a generated drill-through report, drilled cell 304 may include justification marker 309. As shown in FIG. 3, justification marker 309 is a star symbol, indicating that a user selected a "justified" report data justifier after viewing a drill-through report. In examples where a user chose a different report data justifier, justification marker 309 may be a symbol other than a star (e.g., an "X" symbol for "not justified" or a question mark for "inconclusive").

Drill-through menu 310 may also include justification or comment markers associated with each menu item. As one example, menu item 320 may include comment indicator 314, indicating that a user has entered a comment associated with the data of drilled cell 304 related to the dimension group of menu item 318. As another example, menu item 318 may include justification marker 312 indicating that the user has determined that the data value of drilled cell 304 is justified by the drill-through report that is generated by selecting menu item 318.

Figure 4:
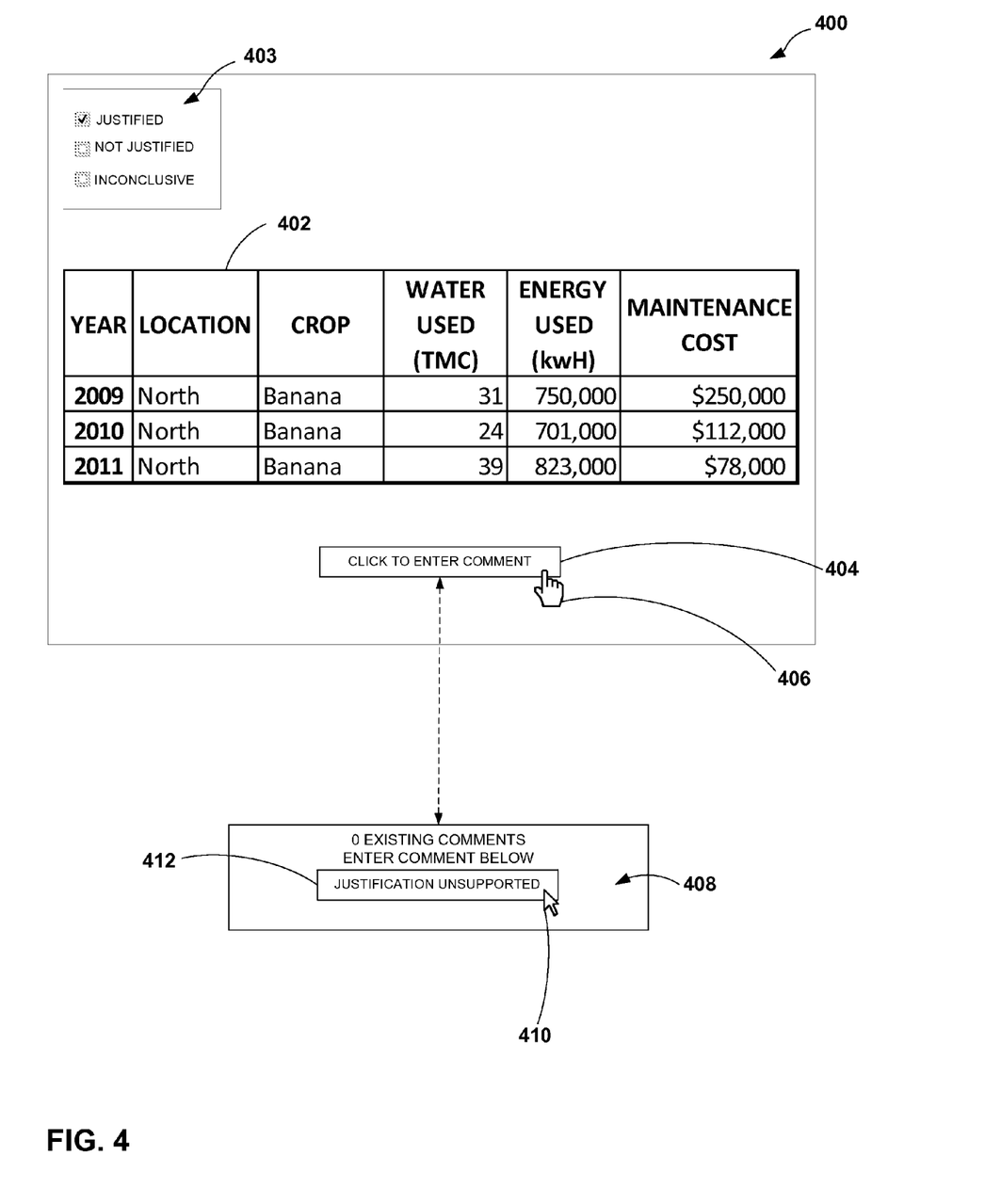
FIG. 4 is a screen illustration of an example of a graphical user interface that includes drill-through reports and user comments, in accordance with one or more aspects of the present disclosure.

FIG. 4 is a screen illustration of an example graphical user interface that includes drill-through reports and user comments, in accordance with one or more aspects of the present disclosure. For purposes of illustration only, the example screen illustration is described below within the context of system 100 of FIG. 1 and computing device 200 of FIG. 2.

GUI 400 includes drill-through report 402, justifier menu 403, comment link 404, selection cursor 406, comment box 408, and cursor 410. Drill-through module 108 may generate drill-through report 402 in response to a user selecting a cell from a source report and then selecting a field from a corresponding drill-through menu. The user may activate comment link 404 (e.g., by clicking using a right button of a mouse of input devices 208, tapping using a stylus of input devices 208, and/or tapping a finger on a presence-sensitive screen of input devices 208) to cause comment module 220 to display comment box 408 in GUI 400. The user may enter one or more comments about the data value selected from the source report in view of drill-through report 402 in comment box 408

Comment box 408 may provide an indication of the number of previously received comments about the selected data value, in view of drill-through report 402. In the specific example of FIG. 4, comment box 408 indicates that no previous comments exist in relation to the selected source report data value in view of drill-through report 402. Comment box 408 may enable a user to input a comment regarding the selected source report data value. In one example, where a first user has selected a report data justifier of "justified" from justifier menu 403, a second user may wish to comment on the first user's selection. To input the comment, the second user may begin by placing cursor 410 over a portion of dialog box 412. The second user may then activate dialog box 412 by using a mouse, stylus, finger, or other input device to click, double-click, or tap on a portion of dialog box 412. After activating dialog box 412, the second user may enter a comment in dialog box 412. In the example of FIG. 4, the second user has entered a comment stating that the first user's selected report data justifier is unsupported. Other users may view previously entered comments and enter additional comments.

Figure 5:
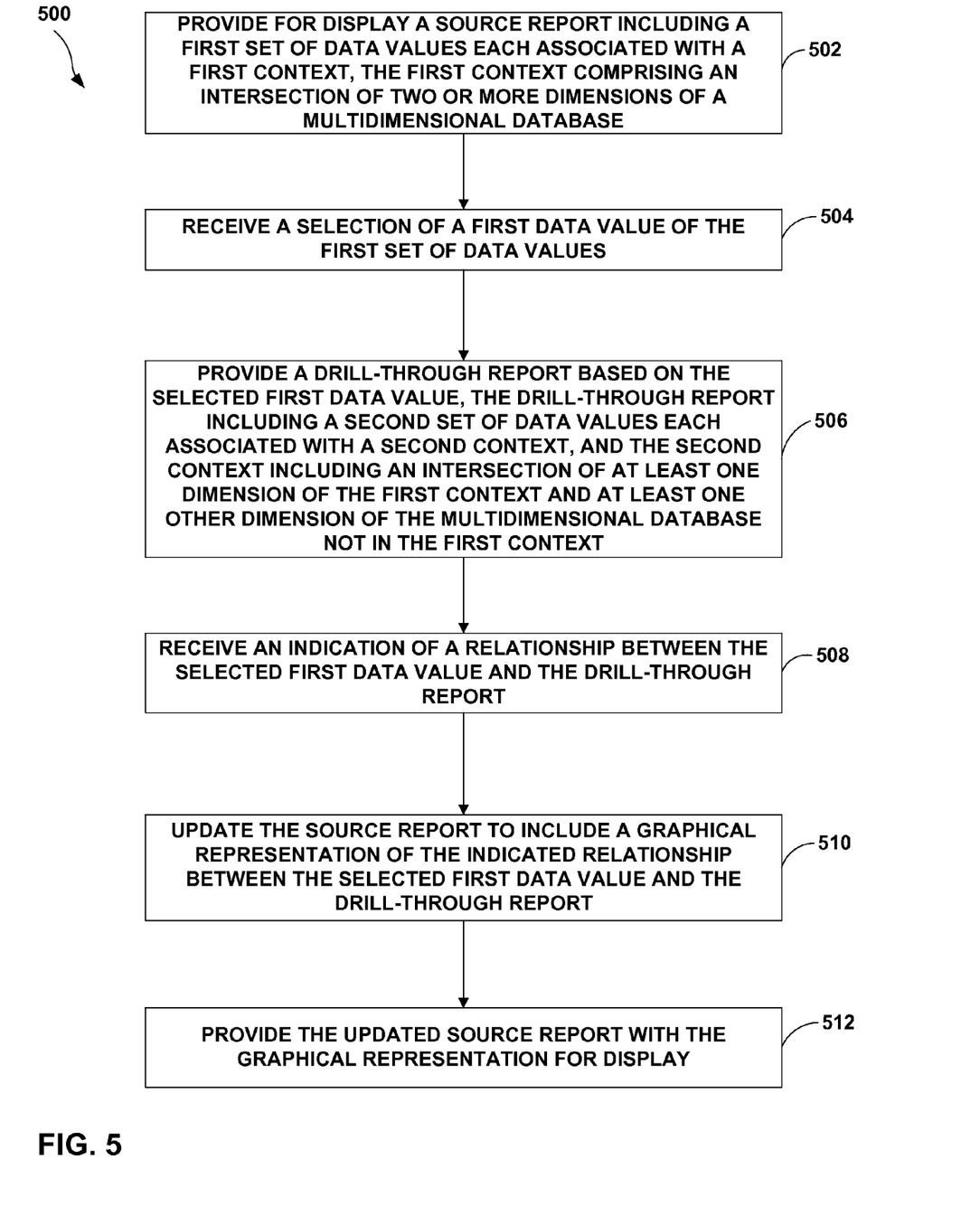
FIG. 5 is a flow chart illustrating an example of an operation of a computing device for displaying a source report and generating a drill-through report responsive to a selection of a data value, in accordance with one embodiment of the present disclosure.

FIG. 5 is a flow chart illustrating an example of an operation of a computing device for displaying a source report and generating a drill-through report responsive to a selection of a data value, in accordance with one embodiment of the present disclosure. Process 500 of FIG. 5 is an example process that may be performed by one or more devices and/or systems described throughout the present disclosure. For purposes of illustration only, process 500 is described below as being performed by one or more elements of system 100 of FIG. 1 and computing device 200 of FIG. 2.

Source report module 107 may provide for display a source report including a first set of data values each associated with a first context, wherein the first context includes an intersection of two or more dimensions of a multidimensional database, such as database 110 (502). For example, source report 112 may include a context that includes an intersection of two dimensions, namely, "locations" (arranged in rows) and "year" (arranged in columns).

Drill-through module 108 may receive a selection of a first data value of the first set of data values (504). The user may enter the selection using one or more of input devices 208. In one example, the user may select the data value by clicking on a cell of source report 112, where the cell is associated with the first data value.

Drill-through module 108 may display drill-through report 116 based on the selected first data value (506). The drill-through report may include a second set of data values each associated with a second context, wherein the second context includes an intersection of at least one of the dimensions of the first context and at least one other dimension of the multidimensional database not in the first context (506). Drill-through report 116 displays an intersection of at least one dimension of the first context (e.g., time, location) and the at least one other dimension not in the first context (e.g., "water usage," "energy usage," and "maintenance cost").

Justification module 109 may receive an indication of a relationship between the selected first data value and the drill-through report (508). Justifier menu 118 includes examples of indications of relationships. Justification module 109 may receive an indication of a relationship between the selected first data value (i.e., the data value of drilled cell 114) and the drill-through report. In this example, the indicated relationship is "justified," suggesting that the selected first data value (of drilled cell 114) is supported sufficiently by the data of drill-through report 116.

Source report module 107 may update the source report to include a graphical representation of the indicated relationship between the selected first data value and the drill-through report (510). Drilled cell 114 has a double-lined border and includes justification marker 120. Either one or both of justification marker 120 and the double-lined border may serve as the graphical representation of the indicated relationship (in this instance, the indicated relationship being "justified"). For an indicated relationship other than "justified," graphical indications may include a marker in a shape that differs from the shape justification marker 120, or a different border design from the double-lined border. In other examples, drilled cell 114 may include a colored background (e.g., green for "justified," red for "not justified," and yellow for "inconclusive") as the graphical representation of the indicated relationship. In still other examples, drilled cell 114 may include a symbol similar to comment marker 120 as the graphical representation of the indicated relationship.

Source report module 107 may cause user interface 104 to provide the updated source report with the graphical representation for display (512). For example, user interface 104 may provide source report 112 updated to include the graphical representation for display. More specifically, source report 112 may be displayed including the double-lined border of drilled cell 114 (the double-lined border serving as the graphical representation).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

The invention claimed is:

1. A computer program product comprising:
a computer-readable storage device having computer-readable program code embodied therewith, the computer-readable program code comprising:
computer-readable program code configured to provide a source report for display, wherein the source report includes a first plurality of data values each associated with a first context, wherein the source report comprises a plurality of cells, wherein each cell of the plurality of cells includes a respective data value of the first plurality of data values, and wherein the first context comprises an intersection of two or more dimensions of a multidimensional database;
computer-readable program code configured to receive a selection of a first cell of the plurality of cells that includes a first data value of the first plurality of data values;
computer-readable program code configured to provide a drill-through report for display, wherein the drill-through report is generated based at least in part on the selected first data value, wherein the drill-through report includes a second plurality of data values each associated with a second context, and wherein the second context comprises an intersection of at least one of the two or more dimensions of the first context and at least one other dimension of the multidimensional database that is not included in the first context;
computer-readable program code configured to receive an indication of a user-specified relationship between the selected first data value and the drill-through report, wherein the user-specified relationship comprises a natural language description that indicates an extent to which the drill-through report provides insight regarding the selected first data value;
computer-readable program code to update the first cell in the source report to include a graphical symbol indicating a presence of the indicated relationship between the selected first data value and the drill-through report; and
computer-readable program code configured to provide, for display, an updated source report having the updated first cell including the graphical symbol indicating the presence of the indicated relationship between the selected first data value and the drill-through report.

2. The computer program product of claim 1,
wherein the plurality of cells comprises a first plurality of cells, and
wherein the drill-through report includes a second plurality of cells each associated with a respective one of the second plurality of data values.

3. The computer program product of claim 1, wherein the graphical indication symbol is associated with a plurality of comments that includes the first comment.

4. The computer program product of claim 1, wherein the graphical symbol of the indicated relationship occupies at least a portion of the first cell associated with the first data value.

5. The computer program product of claim 1, wherein the graphical symbol comprises at least one of a background color of the first cell associated with the first data value and a graphical indication associated with the indicated relationship located within the first cell associated with the first data value.

6. The computer program product of claim 1 further comprising:
computer-readable program code configured to receive a request to remove the indicated relationship; and
computer-readable program code configured to update the source report to exclude the graphical symbol of the indicated relationship based at least in part on the request.

7. The computer program product of claim 1 further comprising:
computer-readable program code configured to receive a request to update the indicated relationship; and
computer-readable program code configured to update the source report to include an updated graphical symbol of the updated indicated relationship based at least in part on the request.

8. The computer program product of claim 1, further comprising:
computer-readable program code configured to receive a selection of a second cell of the plurality of cells that includes a second data value of the first plurality of data values;
computer-readable program code configured to provide another drill-through report for display, wherein the other drill-through report is generated based at least in part on the selected second data value, wherein the other drill-through report includes a third plurality of data values each associated with a third context, and wherein the third context comprises an intersection of at least one of the two or more dimensions of the first context and at least one other dimension of the multi-dimensional database that is not included in the first context and not included in the second context;
computer-readable program code configured to receive an indication of another user-specified relationship, wherein the other relationship comprises a natural language description that indicates an extent to which the drill-through report provides insight regarding the selected second data value;
computer-readable program code to update the second cell in the source report to include another graphical symbol indicating a presence of the indicated other relationship between the selected second data value and the drill-through report; and
computer-readable program code configured to provide, for display, an updated source report having the updated second cell including the other graphical symbol indicating the presence of the indicated other relationship between the selected second data value and the drill-through report for display.

9. The computer program product of claim 1, wherein the computer-readable program code configured to receive the indication of the user-specified relationship between the selected first data value and the drill-through report comprises computer-readable program code configured to receive, from a user, a selection of a report data justifier.

10. The computer program product of claim 9, wherein the report data justifier comprises a value of at least one of: justified, not justified, or inconclusive.

11. A computing device comprising:
one or more processors;
a source report module executable by the one or more processors to provide a source report for display by one or more output devices of the computing device, wherein the source report includes a first plurality of data values each associated with a first context, wherein the source report comprises a plurality of cells, wherein each cell of the plurality of cells includes a respective data value of the first plurality of data values, and wherein the first context comprises an intersection of two or more dimensions of a multidimensional database, and to receive a selection of a first cell of the plurality of cells that includes a first data value of the first plurality of data values;
a drill-through module executable by the one or more processors to provide a drill-through report for display by the one or more output devices of the computing device, wherein the drill-through report is generated based at least in part on the selected first data value, wherein the drill-through report includes a second plurality of data values each associated with a second context, and wherein the second context comprises an intersection of at least one of the two or more dimensions of the first context and at least one other dimension of the multidimensional database that is not included in the first context; and
a justification module executable by the one or more processors to receive an indication of a user-specified relationship between the selected first data value and the drill-through report, wherein the user-specified relationship comprises a natural language description indicating an extent to which the drill-through report provides insight regarding the selected first data value, and to cause the source report module to update the first cell in the source report to include a graphical symbol indicating a presence of the indicated relationship between the selected first data value and the drill-through report, and provide an updated source report having the updated first cell including the graphical symbol indicating the presence of the indicated relationship between the selected first data value and the drill-through report for display by the one or more output devices.

* * * * *